May 23, 1967

A. H. WILLINGER 3,321,082

AQUARIUM FILTER

Filed June 26, 1964

INVENTOR.
ALLAN H. WILLINGER

BY

*Friedman & Goodman*

ATTORNEYS

May 23, 1967     A. H. WILLINGER     3,321,082
AQUARIUM FILTER
Filed June 26, 1964     2 Sheets-Sheet 2

INVENTOR.
ALLAN H. WILLINGER
BY
ATTORNEYS

United States Patent Office 3,321,082
Patented May 23, 1967

3,321,082
AQUARIUM FILTER
Allan H. Willinger, New Rochelle, N.Y., assignor to Aquariums Incorporated, Maywood, N.J., a corporation of Delaware
Filed June 26, 1964, Ser. No. 378,184
3 Claims. (Cl. 210—169)

The present invention relates in general to an aquarium and, in particular, to a filter assembly therefor.

It is an object of the present invention to provide an aquarium filter assembly of the type which is mounted externally of the aquarium tank which will be relatively compact in construction and yet which will nevertheless provide a relatively large volume of abundantly aerated water to the aquarium.

It is another object of the present invention to provide an aquarium filter assembly of the external type which is of generally simplified construction and which is efficient in operation and which can be manufactured at a relatively low cost and sold at a relatively low price.

It is another object of the present invention to provide an external aquarium filter assembly which is easy to disassemble and clean.

It is another object of the present invention to provide an aquarium filter assembly of the external type which is fromed into a single leak-proof unit.

It is a further object of the present invention to provide an aquarium filter assembly in which a relatively small amount of air is utilized to provide the air lift of a relatively large volume of water.

Other and further objects and advantages of the present invention will become readily apparent to one skilled in the art from a consideration of the following specification, taken in connection with the appended drawing.

In the drawing, which illustrates the best mode presently contemplated for carrying out the invention:

Figure 1:
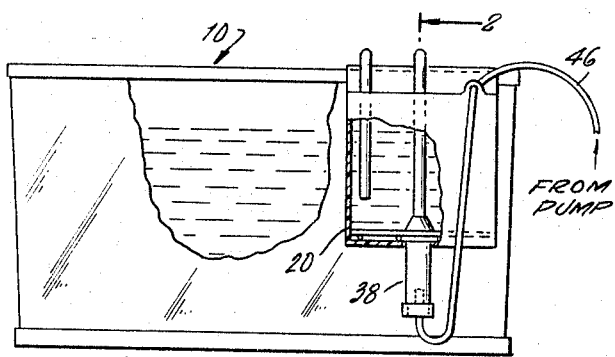
FIGURE 1 is a side elevation view of an aquarium provided with an external filter assembly pursuant to the present invention, parts being broken away and shown in section for purposes of illustration.

Referring now to the drawings in detail, there is shown an aquarium tank 10 provided with a filter assembly 12 pursuant to the present invention. The tank 10 is provided with transparent walls 14 each of which is provided with a rim 16 at the upper marginal edge 18 thereof.

As here shown, the filter assembly 12 is provided with a rectangular receptacle 20 having opposed side walls 22 and 24, and opposed end walls 26 and 28. The side wall 24 is provided at the upper end thereof with a lateral flange or hook 30 which is preferably integral therewith and which hook is adapted to engage over the rim 16 provided on a side wall 14 of the aquarium tank 10. The side wall 24 is provided also with an integral projection or detent 32 which is adapted to engage the outer surface of the aquarium wall on which the receptacle 20 is suspended so as to maintain the receptacle in upright position, as best shown in FIGURE 2.

The filter receptacle 20 is provided also with a bottom wall 34, it being noted that the filter receptacle is open at the top thereof. The bottom wall 34 is provided with an aperture 36 in which there is mounted a cylindrical tube 38. The cylindrical tube 38 is permanently sealed in the aperture 36 or integral therewith so that there is no possibility of water leakage between the upper end of the cylindrical tube 38 and the surface portions of the wall 34 which define the aperture 36 therein. The lower end of the cylinder 38 is open and may be provided with threads 40 so that the cylinder is adapted to be threadedly engaged by a complementary threaded cap 42. It will be understood that the threaded engagement between the cap 42 and the threaded end 40 of the cylinder 38 prevents any leakage of water at the bottom end of the cylinder. As an alternative, cap 42 may be constructed of a soft resilient plastic or soft rubber material which would frictionally engage the lower end of cylinder 38, eliminating the need for any threads or gaskets. The cap 42 is adapted to mount an air inlet tube 44 which is sealed therein so as to prevent leakage between the tube and the cap. The outwardly-projecting end of the air inlet tube 44 is connected to one end of an air supply conduit 46, the other end of which is connected to a suitable pump, not illustrated, for supplying compressed air to the conduit. The air inlet tube 44 is mounted in a gasket 48 which is seated on the inner surface of the cap 42 and substantially fills the entire area of the cylinder 38 at the bottom thereof. The upper end of the air inlet tube 44 projects upwardly from the gasket 48 and extends into a porous diffuser 50. As an alternative, the cap 42 may have the air inlet tube molded integrally therewith and if cap 42 frictionally engages the side walls of cylinder 38, the gasket may then be eliminated. The porous air diffuser 50 is of conventional construction and is provided with a plurality of apertures 52 through which the air which is supplied to the air tube 44 by the conduit 46 passes into the receptacle 20, as indicated by the arrows 54. From the foregoing, it will be apparent that compressed air is supplied to the conduit 46 and passes through the air inlet tube 44, into the cylinder 38, by passing through the apertures 52 in the air stone 50.

Pursuant to a highly novel feature of the present invention, provision is made for a platform 56 provided with a plurality of depending legs 58. The platform 56 is placed at the bottom of the receptacle 20 so that the legs 58 rest upon the bottom wall 34 of the receptacle and space the platform 56 above the bottom wall. As a result, there is defined in the receptacle 20 above the platform 56, a first chamber 60 above the platform 56 for the reception of unfiltered water from the aquarium tank 10 and a second chamber 62 between the platform 56 and the wall 34 for clean water, and hereinafter referred to as a "clean water chamber." It will be noted from FIGURE 4 that the platform 56 is provided with a plurality of apertures 64 to allow for the passage of water from chamber 60 into the clean water chamber 62. The platform 56 is provided, also, with an enlarged aperture 66 which is in registry with the previously mentioned aperture 36 in the base wall 34 of the receptacle 20 when the platform is disposed within the receptacle in the position thereof illustrated in FIGURE 4. The platform is additionally provided with a cone-shaped element 68 which is secured to or integral with the upper surface of the platform 56 and encompasses the aperture 66 therein. As best shown in FIGURE 2, the cone 68 has an enlarged opening 70 at the bottom thereof, in registry with the platform aperture 66, and a restricted top opening 72. A "clean water" return conduit 74 is secured to the top of cone 68 and encompasses the top opening 72 in the latter. At its upper end, the conduit 74 is provided with a laterally-curved end portion 76 which extends over the rim 68 of the aquarium tank and the flanged hook 30 provided on the receptacle 20, as best shown in FIGURE 2, so as to overlie the interior of the aquarium tank. The aquarium filter assembly also includes a siphon tube 78 having a perforated lower end 80 which is adapted to be immersed within the water in the tank 10 and an upper end 82 which is adapted to be immersed within the water in the filter receptacle 20. It will be noted that the conduit 78 has an intermediate portion 84 which rests on the tank rim 16.

Figure 2:
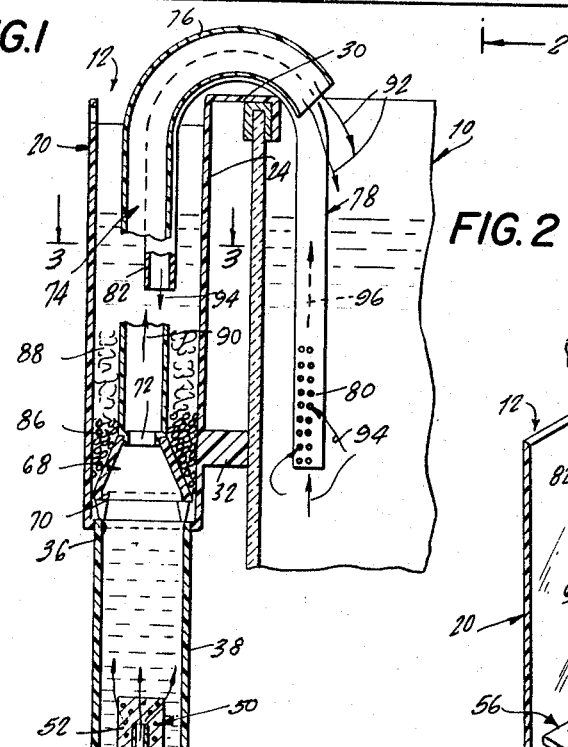
FIGURE 2 is a sectional view on an enlarged scale, taken on the line 2—2 of FIGURE 1.
Figure 3:
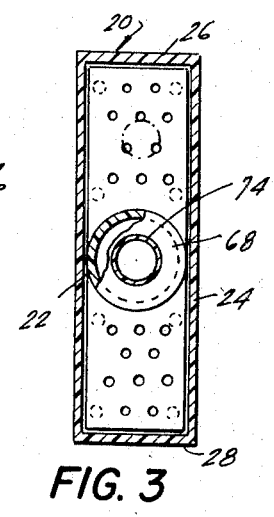
FIGURE 3 is a sectional view, taken on the line 3—3 of FIGURE 2.
Figure 4:
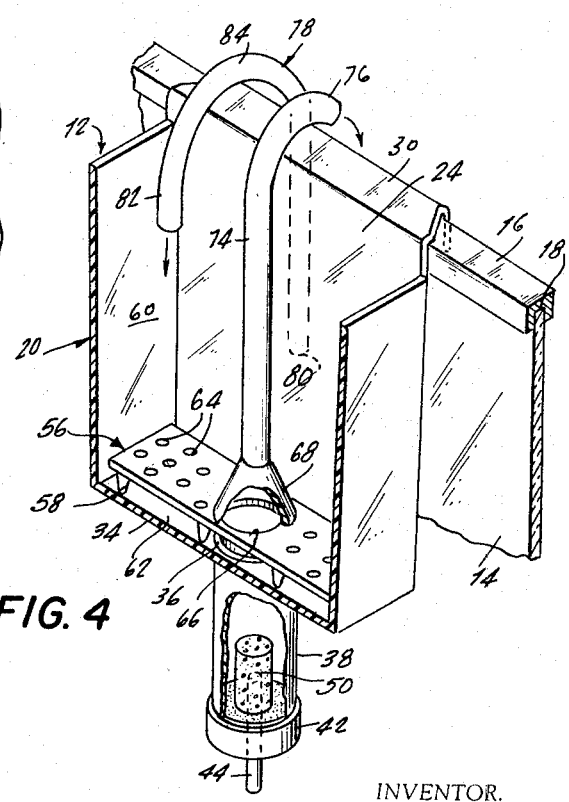
FIGURE 4 is a perspective view of a filter assembly pursuant to the present invention, with portions broken away and shown in section for purposes of illustration.

In operation, the receptacle 20 is hung on the rim 16, as best shown in FIGURES 2 and 4. The platform 56, including the cone 68 and clean water conduit 74, as a unit, is then positioned on the bottom wall of the receptacle 20, as shown in FIGURE 1 and in FIGURE 2. The air input conduit 46 is connected at its free end to a suitable pump. A layer of charcoal, generally indicated by the reference numeral 86, is placed on the platform 56, as shown in FIGURE 2, and a second layer of glass wool, generally indicated by the reference numeral 88, is placed above the charcoal layer 86. The siphon tube 78 is then filled with water and placed in position so that its perforated end 80 is immersed in water in tank 10 and its other end is extended into the receptacle 20. Sufficient water is then siphoned into filter receptacle 20 so as to fill the cylinder 38 extending from the bottom wall 34 thereof and the water level will cover the outlet end 82 of the siphon which is below the level of the aquarium water 97. With the pump in operation, compressed air is supplied through the conduit 46 and through the air inlet tube 44 to the porous air diffuser 50. In passing through the apertures 52 in the porous air diffuser 50, the air is formed into multitudes of bubbles which pass through the apertures, as indicated by the arrows 54 and flow upwardly through the cylinder 38. The upward movement of the compressed air bubbles through the water in the cylinder will also cause the water in the clean water chamber 62 to be forced up into the cone 68 and, through the latter, upwardly into the return water conduit 74, as indicated by the arrow 90 in FIGURE 2. The aerated water then issues from the outlet end 76 of the conduit 74 and flows back into the tank 10, as indicated by the arrows 92. The water flowing from the return water conduit 74 is highly aerated and falls with a relatively vigorous action into the tank water, so as to cause the highly aerated, clean water to diffuse in a relatively vigorous manner through the water in tank 10. As the water level in the receptacle 20 drops below the water level in the tank 10, due to the return of water from the receptacle 20 through the clean water conduit 74, water begins to flow into the apertured end of the siphon 78, as indicated by the arrows 94, and flows upwardly through the siphon, as indicated by the arrow 96. The water then flows back into the receptacle 20, as indicated by the arrow 94. It will be readily apparent then that the water returning from the tank 10, through the siphon 78, to the receptacle 20 by siphon action, is water which must be filtered so as to remove therefrom any impurities or waste matter. The water returning to the receptacle 20 then flows downwardly through the layer of glass wool and the layer of charcoal, which layers of filter material remove the impurities and waste material from the water before the water flows through the aperture 64 in the platform 56, into the clean water chamber 62. Consequently, it will be apparent then that water which must be filtered flows into the unfiltered water chamber 60 and, as the water is filtered, it flows into the clear water chamber 62. The previously mentioned vigorous flow of air bubbles upwardly through the cylinder 38 tends to be concentrated toward the center of the cylinder, with the result that water from the clean water chamber 62 tends to be drawn downwardly, along the interior surfaces of the cylinder 38, toward the bottom of the cylinder, and when the water reaches the air diffuser 50, it is then moved upwardly substantially centrally of the cylinder by the vigorous flow of air bubbles. As a result, it will be apparent that there is established a circulatory water action in the cylinder 38 as the water flows along the inner surface of the cylinder from the clear water chamber 62 downwardly, toward the cap 42, and then flows upwardly, substantially in the center of the cylinder, to be forced then through the cone 68 and into the clear water return conduit 74, for return to the tank 10, the water issuing in a relatively vigorous manner from the outlet end 76 of the conduit 74 and falling, with a forced movement, into the tank water.

Figure 5:
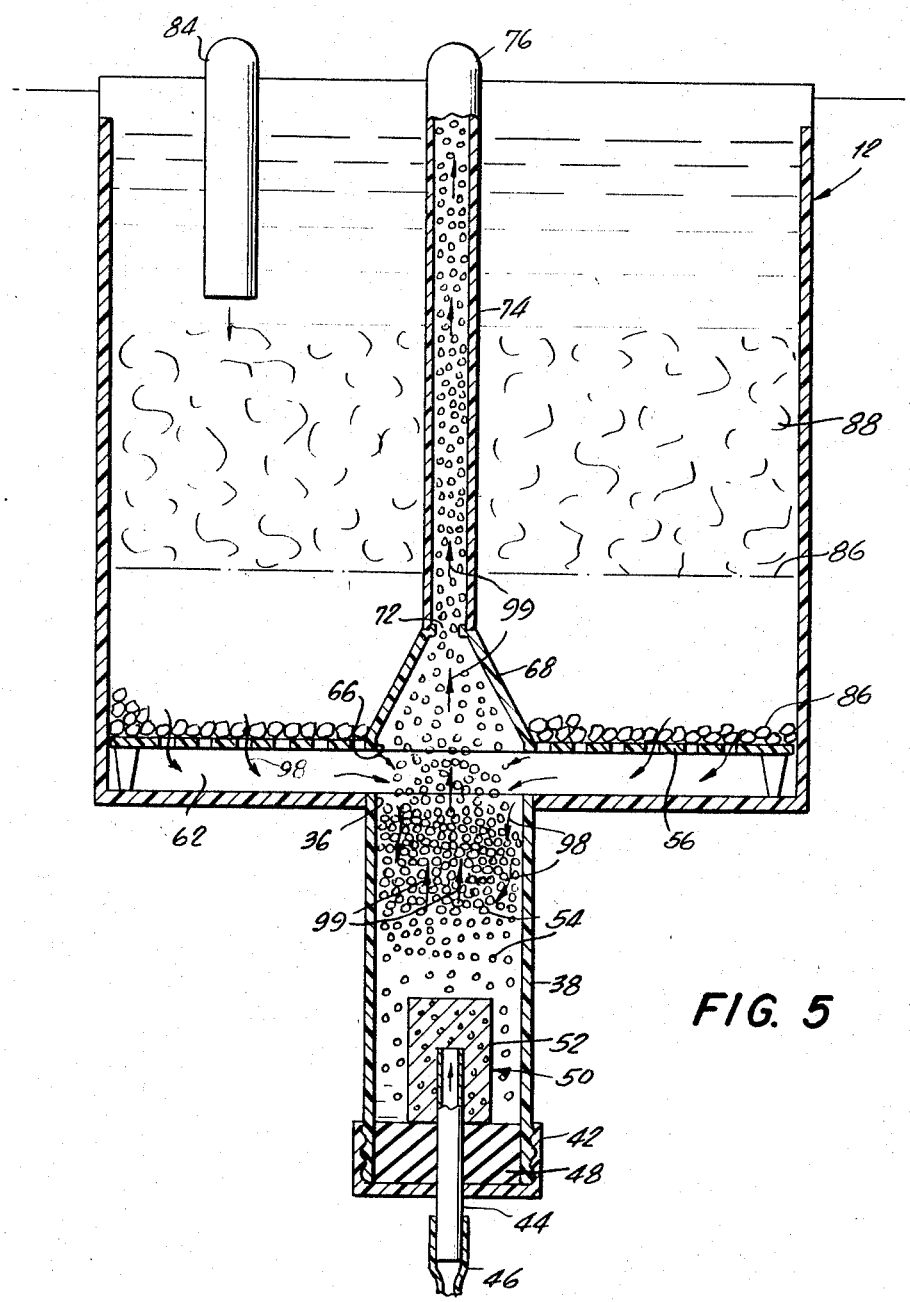
FIGURE 5 is a more or less diagrammatic illustration of the air-lift water action pursuant to the present invention.

The foregoing water action is more specifically illustrated in FIGURE 5. It will be noted that the cylinder 38, cone 68 and conduit 74 define an air-lift to be means for lifting water in cylinder 38 up through the cylinder, the cone and the conduit into the aquarium 10. However, this air-lift tube construction is continuous, being interrupted between aperture 36 in bottom wall 34, and aperture 66 in platform 56, by the clean water chamber 62. As a result, the downward flow of water from the clean water chamber into the cylinder, as indicated by the arrows 98, will impede the rapid rise of air bubbles 54 in the cylinder. This creates a frothing and churning effect in the water within the cylinder 38. This action tends to concentrate the air bubbles in the central water volume within the cylinder until the bubbles become so dense that they exceed and overcome the pressure of the downward flow of water, as indicated by arrows 98, from the clean water chamber into the cylinder. Upon exceeding the downward pressure, the bubbles 54 vigorously move upwardly, as indicated by arrows 99 and force themselves out through opening 36, moving through the clean water chamber and into opening 66 and through the cone 68. The bubbles are restricted in the cone so as to increase the air pressure, with the result that the aerated water is vigorously forced up conduit 74 to be forcefully expelled into the tank 10. The large concentration of bubbles in the cylinder causes the water therein to become well aerated and lighter in weight so that a relatively small amount of air is required to lift the water from the cylinder into the aquarium.

From the foregoing, it will be apparent that there has been illustrated and described a highly novel and efficient, yet generally simplified, filter assembly for an aquarium tank or the like. It will be understood that various changes and modifications may be made therein without, however, departing from the inventive concept thereof, as set forth in the appended claims.

I claim:

1. An aquarium filter assembly comprising a filter receptacle adapted to be suspended on the exterior of an aquarium tank, said filter receptacle having a bottom wall and a platform spaced above said bottom wall to define in said receptacle a filter chamber above said platform and a clean water chamber below said platform, said chambers being in fluid flow relation through said platform, said bottom wall having an aperture defined therein and being provided with a clean water reservoir in registry with said aperture for the flow of clean water from said clean water chamber into said reservoir, said platform having an aperture defined therein in registry with said wall aperture, conduit means extending from said platform through said filter chamber and terminating outwardly of said receptacle for supplying clean water to the aquarium tank, means for supplying compressed air to said reservoir to air lift the water in said reservoir through said wall aperture, said clean water chamber and said conduit means and a siphon tube extending into said filter chamber for the siphoned flow of water from the aquarium tank into said filter chamber.

2. An aquarium filter as in claim 1, said reservoir having air diffusion means to form said compressed air into multitudinous bubbles which rise upwardly in opposition to the downward flow of water from said clean water chamber into said reservoir.

3. An aquarium filter as in claim 1, said conduit means comprising a conical element having its larger end mounted on said platform in registry with said platform aperture and a water pipe extending from the smaller end of said conical element and terminating outwardly of said filter chamber.

References Cited by the Examiner

UNITED STATES PATENTS

| | | | |
|---|---|---|---|
| 2,293,051 | 8/1942 | Duffy. | |
| 2,782,161 | 2/1957 | Willinger et al. | 210—169 |
| 2,783,893 | 3/1957 | Romanoff | 210—169 X |
| 3,135,238 | 6/1964 | Eyl | 210—169 X |
| 3,261,471 | 7/1966 | Halpert | 210—169 |

SAMIH N. ZAHARNA, *Primary Examiner.*

REUBEN FRIEDMAN, *Examiner.*

F. W. MEDLEY, *Assistant Examiner.*